United States Patent
Lu et al.

(10) Patent No.: US 10,512,987 B2
(45) Date of Patent: Dec. 24, 2019

(54) LASER SHOCK PEENING METHOD FOR OBTAINING LARGE-AREA UNIFORM SURFACE MORPHOLOGY

(71) Applicant: Jiangsu University, Jiangsu (CN)

(72) Inventors: Jinzhong Lu, Jiangsu (CN); Jia Xing, Jiangsu (CN); Kaiyu Luo, Jiangsu (CN); Tong Lin, Jiangsu (CN)

(73) Assignee: Jiangsu University, Jiangsu (CN)

( * ) Notice: Subject to any disclaimer, the term of this patent is extended or adjusted under 35 U.S.C. 154(b) by 514 days.

(21) Appl. No.: 15/307,891

(22) PCT Filed: Aug. 26, 2014

(86) PCT No.: PCT/CN2014/085197
§ 371 (c)(1),
(2) Date: Oct. 31, 2016

(87) PCT Pub. No.: WO2016/008198
PCT Pub. Date: Jan. 21, 2016

(65) Prior Publication Data
US 2017/0050265 A1  Feb. 23, 2017

(30) Foreign Application Priority Data

Jul. 16, 2014  (CN) .......................... 2014 1 0337877

(51) Int. Cl.
*B23K 26/352* (2014.01)
*C21D 1/09* (2006.01)
(Continued)

(52) U.S. Cl.
CPC ...... *B23K 26/3576* (2018.08); *B23K 26/0732* (2013.01); *B23K 26/146* (2015.10);
(Continued)

(58) Field of Classification Search
CPC ............ B32K 26/0069; B32K 26/0732; B32K 26/18; B32K 26/146; B32K 26/0075; B32K 26/356
(Continued)

(56) References Cited

U.S. PATENT DOCUMENTS 7,776,165 B1  8/2010  Dulaney et al.
2004/0224179 A1  11/2004  Sokol et al.
(Continued)

FOREIGN PATENT DOCUMENTS

CN  101590569 A  * 12/2009
CN  103302406 A  9/2013
(Continued)

*Primary Examiner* — Thien S Tran
(74) *Attorney, Agent, or Firm* — Saliwanchik, Lloyd & Eisenschenk

(57) ABSTRACT

Provided is a laser shock peening method for obtaining a large-area uniform surface morphology. Using the relationship between the thickness of an absorption layer and a plastic deformation due to the laser shock peening and using a grid-shaped absorption layer (5) having a staggered distribution in thickness in cooperation with a two-layer interlaced laser shock processing method significantly reduce the height difference between micro-protrusions (10) and micro-pits (12) produced by an impact of a square light spot, and effectively reduce the roughness of the workpiece surface such that a large-area uniform surface morphology is formed on the workpiece surface.

6 Claims, 2 Drawing Sheets

(51) Int. Cl.
*B23K 26/146* (2014.01)
*B23K 26/356* (2014.01)
*B23K 26/073* (2006.01)
*B23K 26/18* (2006.01)
*C21D 10/00* (2006.01)

(52) U.S. Cl.
CPC ............ *B23K 26/18* (2013.01); *B23K 26/356* (2015.10); *C21D 1/09* (2013.01); *C21D 10/005* (2013.01)

(58) Field of Classification Search
USPC ............ 219/121.61, 121.69, 121.78, 121.83, 219/121.85
See application file for complete search history.

(56) References Cited

U.S. PATENT DOCUMENTS

2006/0124619 A1\* 6/2006 Mannava ............ C21D 10/005
219/121.85
2013/0052479 A1\* 2/2013 Seetharaman ........... C21D 7/06
428/636

FOREIGN PATENT DOCUMENTS

| CN | 203700450 U | 7/2014 |
| JP | 2011-89793 A | 5/2011 |

\* cited by examiner

LASER SHOCK PEENING METHOD FOR OBTAINING LARGE-AREA UNIFORM SURFACE MORPHOLOGY

CROSS REFERENCE TO RELATED APPLICATIONS

This application is a National Stage Application of International Application Number PCT/CN2014/085197, filed Aug. 26, 2014; which claims priority to Chinese Application No. 201410337877.X, filed Jul. 16, 2014; all of which are incorporated herein by reference in their entirety.

FIELD OF THE INVENTION

The present invention relates to laser shock peening and, more particularly, to methods and articles of obtaining uniform surface morphology with a large area on the surface of metallic component by employing two-layer interleaved LSP process with the latticed absorbing layer.

BACKGROUND OF THE INVENTION

Laser shock peening (LSP) is a new technology for strengthening material surface using intense shock wave induced by high-power pulsed laser, which has four distinct characteristics of high pressure, high energy, ultra-fast and ultra-high strain rate. The compressive residual stress produced by LSP can effectively eliminate stress concentration, and restrain crack initiation and growth in the surface layer of metallic components. It further remarkably improves the fatigue life, corrosion and wear resistance of the metallic components. Many researches showed that LSP is an effective method to prolong the time of crack initiation, reduce the crack growth speed and improve the fatigue life of components.

Surface morphology and surface roughness have a significant effect on the quality and property of metallic components, which directly affect the contact strength, corrosion resistance, wear resistance, fatigue resistance and sealing performance.

Due to the plastic deformation produced by LSP, micro-indentions occur in the surface. The spot edge is easy to bulge because of boundary effect. Hence the initiation and growth of fatigue cracks occur with both the increasing of the surface roughness and the formation of stress concentration. In practice, overlapping round spots are applied to strengthen the surface with a large area, which brings higher surface roughness and stress concentration. Moreover, this process further leads to the non-uniform distribution of residual stress on the surface of metallic component, and the inconsistent in the depth direction. As a result, fatigue failure of metallic components occurs.

BRIEF DESCRIPTION OF THE INVENTION

Aspects and advantages of the invention are set forth below in the following description, or may be obvious from the description, or may be through practice of the invention.

Among the advantages provided by the present invention is inducing a large area of uniform surface morphology using LSP. Another advantage of the present invention is that this method can obviously reduce the height difference between micro-convex and micro-concave. The present invention provides metallic components with better surface quality by controlling plastic deformation on the surface of metallic components.

One embodiment of the present invention is a method for LSP. The method includes a two-layer interleaved process used on the surface of metallic components. The method further includes a latticed absorbing layer cooperating with two-layer interleaved process to induce a uniform surface morphology with a large area.

Another embodiment of the present invention is a method for LSP. The method includes a two-layer interleaved process used on the surface of metallic components with different parameters. The method further includes a latticed absorbing layer cooperating with two-layer interleaved process to induce a uniform surface morphology with a large area.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

Figure 1:
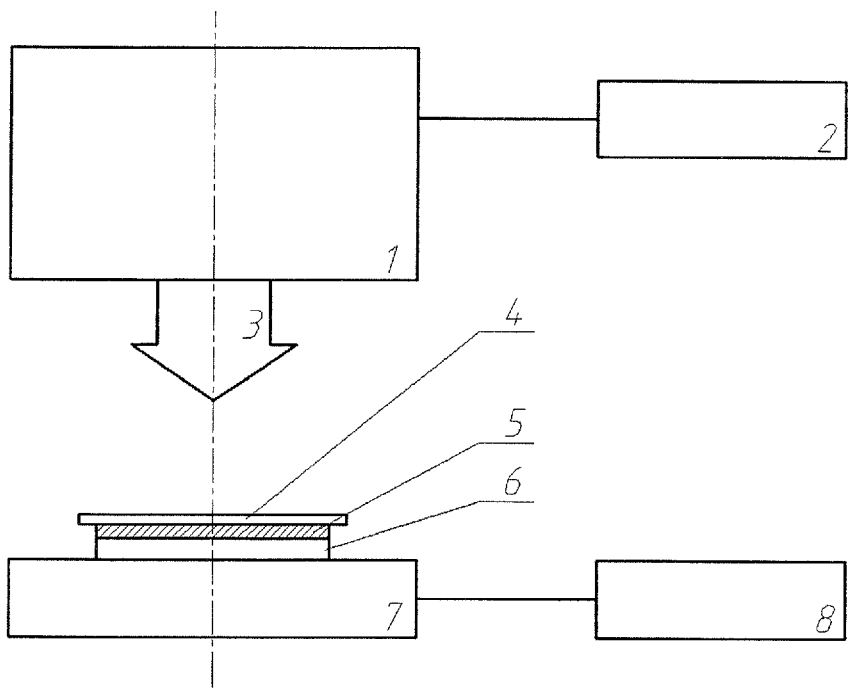
FIG. 1 is an illustration of a LSP system that can be used to induce a uniform surface morphology with a large area.
Figure 2:
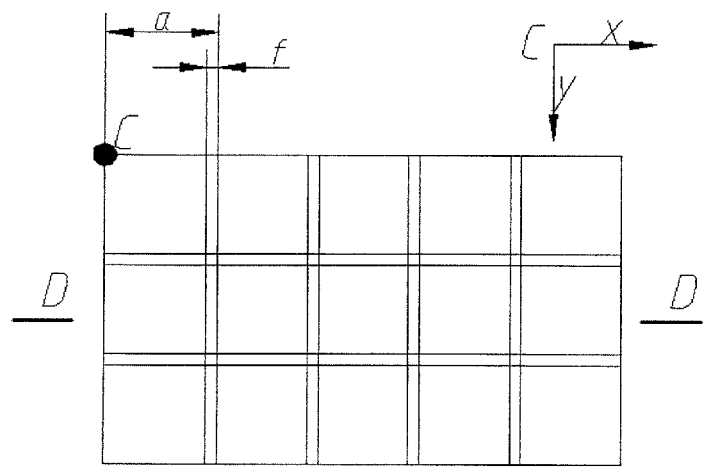
FIG. 2 is an illustration of the front-view of a latticed absorbing layer, wherein D-D is an cross-sectional illustration of a latticed absorbing layer. While a is the length of the square-spot, f is the overlapped distance of adjacent square-spots, f/a is the overlapping rate, d1 is the thickness of overlapped area of adjacent square-spots, d2 is the thickness of other areas.
Figure 2:
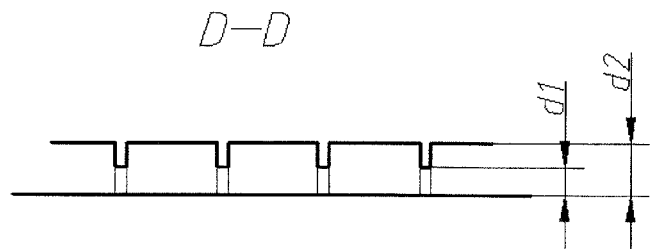

1 laser generation device, 2 laser control device, 3 square-spot, 4 running water constraint layer, 5 latticed absorbing layer, 6 work-piece, 7 five-axis workbench, 8 numerical control system, 9 rectangular region to be treated by LSP, 10 micro-convex, 11 starting position, 12 micro-concave, 22 center region, 23 transitional region, 24 edge region.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Mount the work-piece 6 on a five-axis workbench 7 and paste the latticed absorbing layer 5 onto the surface of work-piece 6 to be processed.

Use a laser control device 2 to set the laser output power and the laser spot parameters, modulate the round laser spot into square-spot 3, and the overlapping distance between adjacent square-spots 3 is f.

Use a numerical control system 8 to adjust the five-axis workbench 7, so as to make the center of the square-spot 3 and the center of a single lattice of the absorbing layer 5 overlapped at the point A. Fix position accurately along the X- and Y-direction of the latticed constraint layer 4.

Take running water as the constraint layer 4, turn on the laser generation device 1 and operate the numerical system 8 to control both translation and rotation of the five-axis workbench 7, so as to treat the surface of the work-piece 6 in a row-by-row way on the first layer.

Figure 3:
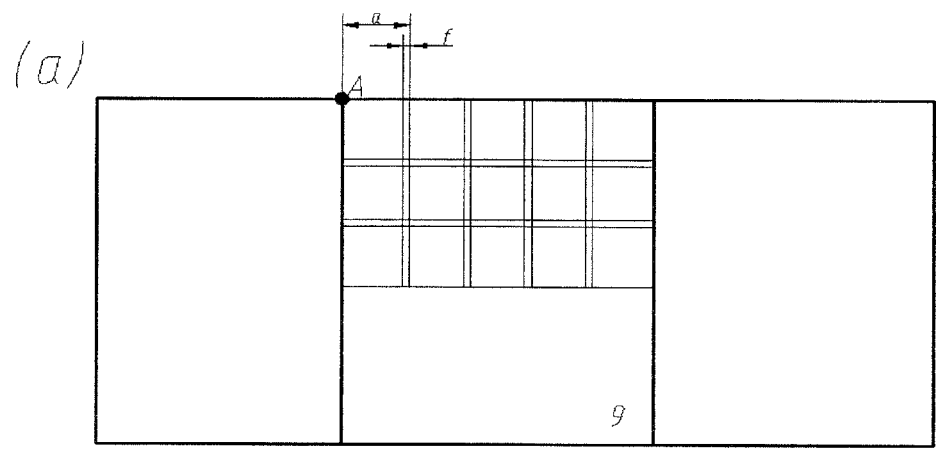
FIG. 3 is an illustration of square-spot arrangement in the laser shocked region on the work-piece surface. (a) the first layer, (b) the second layer. Where a is the length of the square-spot, f is the overlapped distance between adjacent square-spots, point A is the starting position in the first layer subjected to LSP, and point B is the starting position in the second layer subjected to LSP.
Figure 3:
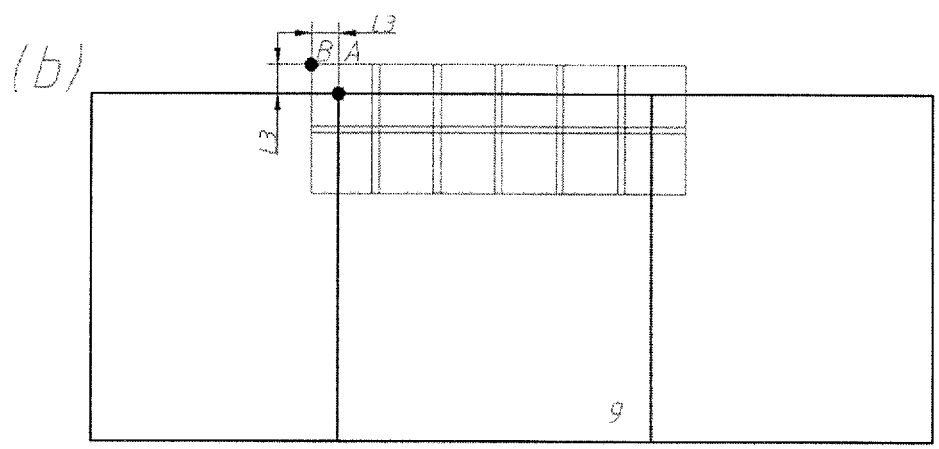
Figure 4:
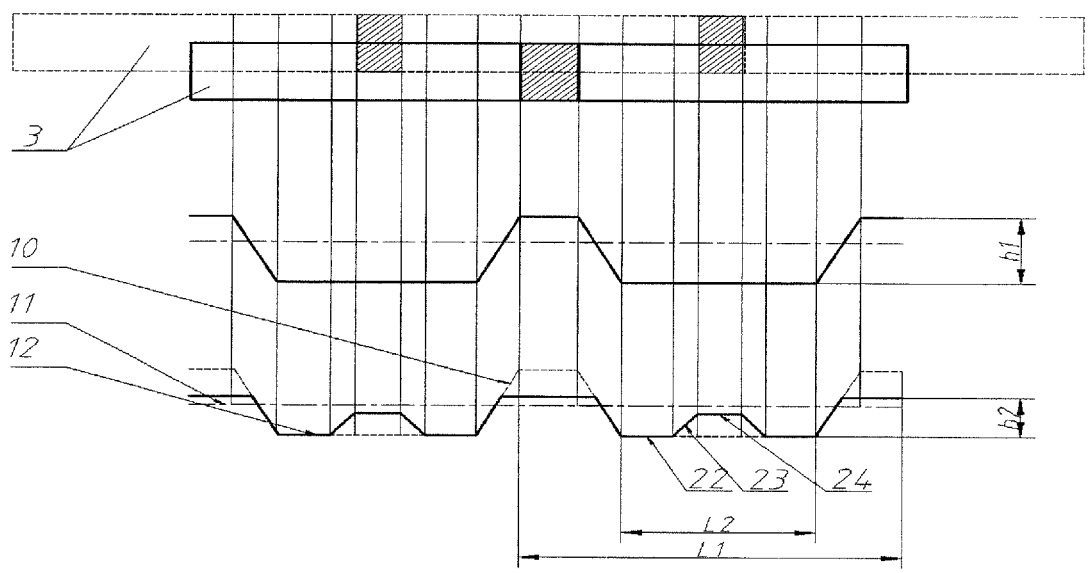
FIG. 4 is a cross-sectional illustration of the work-piece subjected to LSP.

Use the numerical control system 8 to adjust the five-axis workbench 7, so as to make the overlap between the position of the square-spot 3 and the corner of a single lattice of the absorbing layer 5, to move a/2 outward the initial corner of the laser shocked region in the first layer, both along the X- and Y-directions. This new overlapped corner is then taken as the starting position 11 in the second layer subjected to LSP, namely the point B in FIG. 3(b). The X- and Y-directions of the latticed constraint layer 4 should again agree well with those of the workbench.

Take running water as the constraint layer 4, turn on the laser generation device 1 and operating the numerical system 8 to control both translation and rotation of the five-axis workbench 7, so as to treat the surface of the work-piece 6 in a row-by-row way on the second layer.

The pulse laser beam used during LSP in the present invention is square-spot 3, the length of the square-spot 3 is 2-8 mm, laser frequency is 1-5 Hz, pulse width is 8-30 ns, and pulse energy is 3-15 J.

The design of the said latticed absorbing layer 5: the absorbing layer 5 corresponding to the overlapped area between both adjacent square-spots 3 has a smaller thickness (d1), while the absorbing layer 5 corresponding to other areas has a larger thickness (d2), the front-view of the absorbing layer 5 that has a smaller thickness is a concavity, while the back is a plane, the smaller thickness d1 is calculated by $d1=V\tau$, where, V is the gasification rate of the coating and $\tau$ is the lasting time of the pressure pulse which is 3-4 times of the width of the pulse laser, the larger thickness d2 is calculated by $d2=d1\times\sqrt{1+\sigma}$, where, $\sigma$ is the Poisson's ratio of the shocked material, the fillet radius of the concavity is 0.1-0.2 mm, and the back of the latticed absorbing layer 5 is sticky, which can be stick to a smooth surface of the work-piece 6.

Taking two-layer interleaved LSP, technological parameters of the two-layer LSP keep unchanged, and the distance between the starting position 11 of the second layer and that of the first layer is a/2 in both along the X- and Y-directions. During the process of each layer with square-spots 3, the overlapping rates f/a between adjacent square-spots are set to 8-12%.

The preparation method of the latticed absorbing layer 5 in the present invention is: mix organic silica gel GN-521, cyanoacrylate and methyl tert-butyl ether at the mass ratio of 5:3:2 and allow them to react at 70-90° C. for 10 min~30 min, suppress a terrace die according to the length of the square-spot 3 and the overlapping rate on the front-view of the absorbing layer, the back is a plane, and the absorbing layer with a thickness of 0.8-1 mm can finally be formed after being cooled.

The beneficial effect of the present invention: obviously reduce the height difference between micro-convex 10 and micro-concave 12, control plastic deformation of the work-piece 6 surface, and decrease the surface roughness.

What is claimed is:

1. A laser shock peening (LSP) method for improving surface morphology of a work piece, the method comprising:

mounting the work piece on a workbench;

disposing a latticed absorbing layer onto a surface of the work piece;

providing a laser and a laser control device;

using the laser control device to set laser output power and laser parameters of the laser, modulate a laser output spot into a square spot, and set an overlapping distance between adjacent square spots to a value off f;

using a numerical control system to adjust the workbench, so as to make a position of a laser beam of the laser overlap a first corner of a first lattice of the latticed absorbing layer at a first initial corner of a first shocking area, wherein the first corner of the first lattice of the latticed absorbing layer is then considered as a first initial position of a first layer of LSP;

providing running water as a constraint layer over the latticed absorbing layer;

applying the laser and operating the numerical control system to control both translation and rotation of the workbench, so as to impact the surface of the work piece by LSP in a row-by-row manner on the first layer of LSP, wherein an X-direction and a Y-direction of the constraint layer match those of the workbench;

using the numerical control system to adjust the workbench to move a distance of a/2 in both the X-direction and Y-direction, so as to make the position of the laser beam of the laser overlap a second corner of a second lattice of the latticed absorbing layer at a second initial corner of a second shocking area, wherein the second corner of the second lattice of the latticed absorbing layer is then considered as a second initial position of a second layer of LSP, wherein a is a length of a side of the square spot; and providing running water again as the constraint layer, and applying the laser and operating the numerical system to control both translation and rotation of the workbench, so as to impact the surface of the work piece in a row-by-row manner on the second layer of LSP, wherein technological parameters of the laser application on the first layer of LSP are the same as those on the second layer of LSP, wherein the method reduces surface roughness of the surface of the work piece and has a strengthening effect on the surface of the work piece, wherein the latticed absorbing layer has a first thickness (d1) in an overlapped area where adjacent square spots overlap and a second thickness (d2) in other areas, where d2 is greater than d1 and is calculated as $d2=(d1)\times(1+\sigma)^{1/2}$, where $\sigma$ is a Poisson ratio of a material of the latticed absorbing layer, wherein d1 is calculated as $d1=V\tau$, where V is a gasification rate of the latticed absorbing layer and $\tau$ is a duration time of a pressure pulse on the latticed absorbing layer, where $\tau$ is three to four times larger than a pulse width of the laser during laser application, wherein the latticed absorbing layer in the overlapped area comprises a concavity on an upper surface thereof, a fillet radius of the concavity being 0.1 millimeters (mm) to 0.2 mm, and wherein a lower surface of the latticed absorbing layer is configured to adhere to the surface of the work piece.

2. The method according to claim 1, wherein the workbench is a five-axis workbench.

3. The method according to claim 2, wherein the length a of the side of the square spot is 2 mm to 8 mm, and
wherein the technological parameters of the laser application on the first layer of LSP, which are the same as those on the second layer of LSP, are as follows: a laser frequency of 1 Hertz (Hz) to 5 Hz; the pulse width of 8 nanoseconds (ns) to 30 ns; and a pulse energy of 3 Joules (J) to 15 J.

4. The method according to claim 2, wherein the bottom surface of the latticed absorbing layer is a planar surface that is sticky.

5. The method according to claim 2, wherein when the laser beam of the laser overlaps the firsts corner of the first lattice of the latticed absorbing layer and when the laser beam of the laser overlaps the second corner of the second lattice of the latticed absorbing layer, a ratio (f/a) of the overlapping distance (f) to the length of the side of the square spot (a) 0.08 to 0.12.

6. A laser shock peening (LSP) method for improving surface morphology of a work piece, the method comprising:
mounting the work piece on a workbench;
disposing a latticed absorbing layer onto a surface of the work piece;
providing a laser and a laser control device;
using the laser control device to set laser output power and laser parameters of the laser, modulate a laser output spot into a square spot, and set an overlapping distance between adjacent square spots to a value of f;
using a numerical control system to adjust the workbench, so as to make a position of a laser beam of the laser overlap a first corner of a first lattice of the latticed absorbing layer at a first initial corner of a first shocking area, wherein the first corner of the first lattice of the latticed absorbing layer is then considered as a first initial position of a first layer of LSP;
providing running water as a constraint layer over the latticed absorbing layer;
applying the laser and operating the numerical control system to control both translation and rotation of the workbench, so as to impact the surface of the work piece by LSP in a row-by-row manner on the first layer of LSP, wherein an X-direction and a Y-direction of the constraint layer match those of the workbench;
using the numerical control system to adjust the workbench to move a distance of a/2 in both the X-direction and Y-direction, so as to make the position of the laser beam of the laser overlap a second corner of a second lattice of the latticed absorbing layer at a second initial corner of a second shocking area. wherein the second corner of the second lattice of the latticed absorbing layer is then considered as a second initial position of a second layer of LSP, wherein a is a length of a side of the square spot; and
providing running water again as the constraint layer, and applying the laser and operating the numerical system to control both translation and rotation of the workbench, so as to impact the surface of the work piece in a row-by-row manner on the second layer of LSP,
wherein technological parameters of the laser application on the first layer of LSP are the same as those on the second layer of LSP,
wherein the method reduces surface roughness of the surface of the work piece and has a strengthening effect on the surface of the work piece, and
wherein the method further comprises preparing the latticed absorbing layer by:
mixing organic silica gel GN-521, cyanoacrylate, and methyl tert-butyl ether at a mass ratio of 5:3:2 (silica gel:cyanoacrylate:methyl tert-butyl ether) and allowing them to react at a temperature of 70° C. to 90° C. for a period of time of 10 minutes to 30 minutes to form a mixture die;
modifying the mixture die according to the length of the side of the square spot (a) and a ratio (f/a) of the overlapping distance (f) to the length of the side of the square spot (a) while maintaining a bottom surface as a plane; and
cooling the modified mixture die to form the latticed absorbing layer having a thickness of 0.8 mm to 1 mm.

* * * * *